United States Patent [19]
Walser et al.

[11] Patent Number: 5,598,414
[45] Date of Patent: Jan. 28, 1997

[54] ACCESS TO TRANSMIT ON A MESSAGE PRIORITY BASIS

[76] Inventors: Robert A. Walser, Box 1240, 2395 Campo Flores La., West Point, Calif. 95255; Earl E. Rydell, R.R. #1, Box 326F, Swisher, Iowa 52338

[21] Appl. No.: 72,664

[22] Filed: Jun. 4, 1993

Related U.S. Application Data

[63] Continuation of Ser. No. 652,805, Feb. 6, 1991, abandoned.
[51] Int. Cl.⁶ .................................................. H04J 3/02
[52] U.S. Cl. .................................... 370/455; 340/825.5
[58] Field of Search .............................. 370/85.4, 86.5, 370/85.6, 94.1, 85.1, 60, 85.15, 85.14, 85.12; 340/825.05, 825.5, 825.51, 825.52

[56] References Cited

U.S. PATENT DOCUMENTS

| | | | |
|---|---|---|---|
| 4,295,112 | 10/1981 | Hatada et al. | 340/825.5 |
| 4,556,974 | 12/1985 | Kozlik | 370/85.4 |
| 4,566,097 | 1/1986 | Bederman | 370/85.6 |
| 4,604,742 | 8/1986 | Hamada et al. | 370/85.4 |
| 4,680,757 | 7/1987 | Murakami et al. | 370/85.4 |
| 4,709,364 | 11/1987 | Hasegawa et al. | 370/85.4 |
| 4,726,018 | 2/1988 | Bux et al. | 370/85.5 |
| 4,736,368 | 4/1988 | Szczepanek | 370/85.6 |
| 4,819,229 | 4/1989 | Pritty et al. | 370/85.5 |
| 5,070,501 | 12/1991 | Shimizu | 370/85.4 |

FOREIGN PATENT DOCUMENTS 0147644 7/1985 European Pat. Off. .

OTHER PUBLICATIONS

Concepts and Operational Experience for 9B Ring Bus Standards Development, Robert A, Walser, FMC, corporation, Apr. 21–24, 1986, pp. (1–11).

Primary Examiner—Benedict V. Safourek
Assistant Examiner—Dang Ton
Attorney, Agent, or Firm—Michael Lee; R. C. Kamp

[57] ABSTRACT

A transmit-receive station connected to a high speed ring bus carrying data signals that may be received from and sent to each station on the ring bus has two sources of transmit clocking signals. One source is based on the frequency and phase of data signals received on the ring bus from another station and the other source is a local crystal oscillator having essentially the same frequency as the first source but in an indeterminate phase. When changing the source of clocking signals for transmission of data originating at the station, bit slippage may be minimized by providing the local oscillator output signal in four phases and using the phase most nearly aligned with the other clocking signal when the change is made. Control of access to transmit by a station employs a token having a message field of seven bits and an access control bit. Each message frame ready for transmission is assigned a priority number which is used with the token to cause the data message frames at different stations to be transmitted in a sequence based on their respective priority numbers.

14 Claims, 5 Drawing Sheets

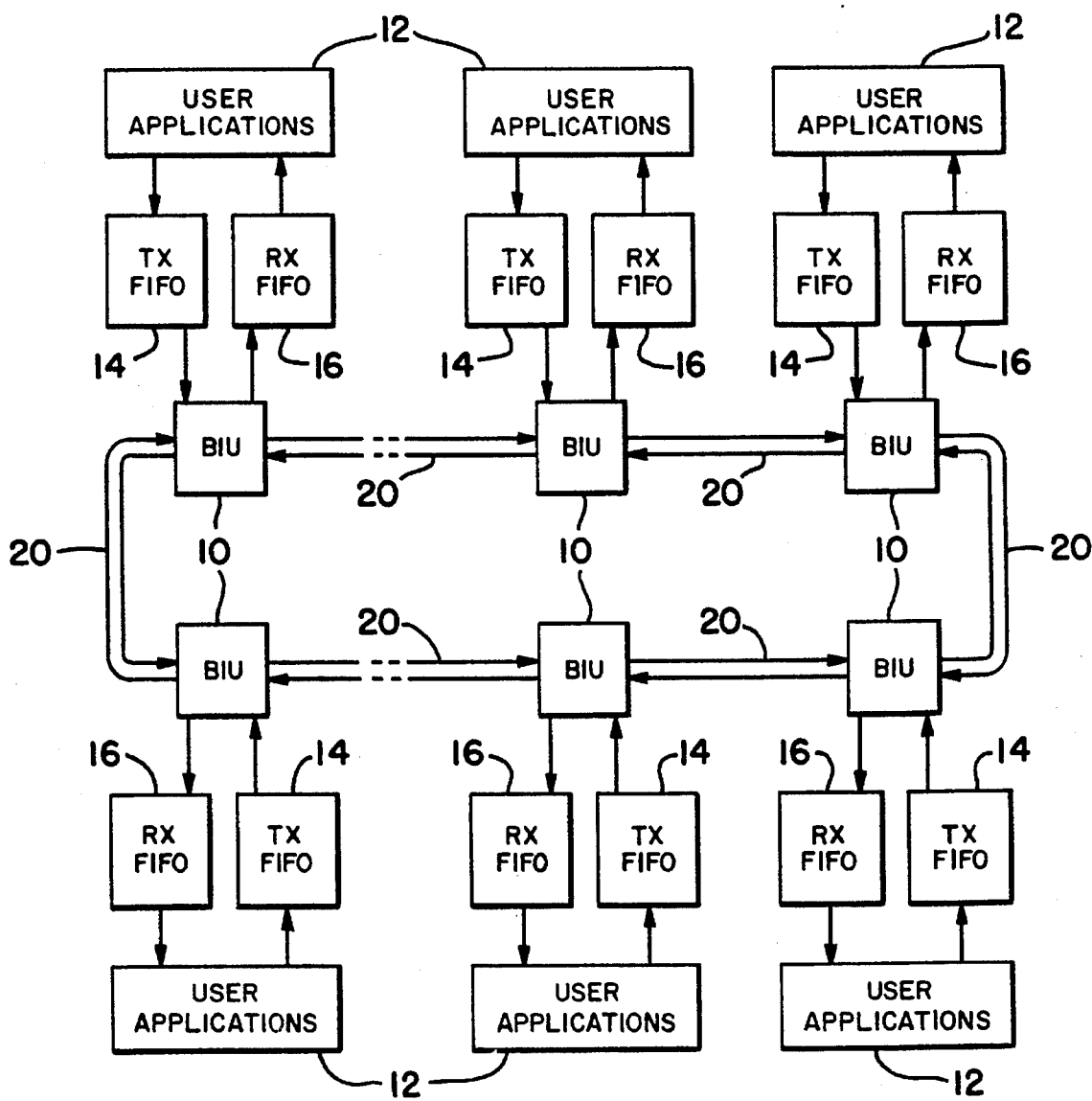

FIG_2
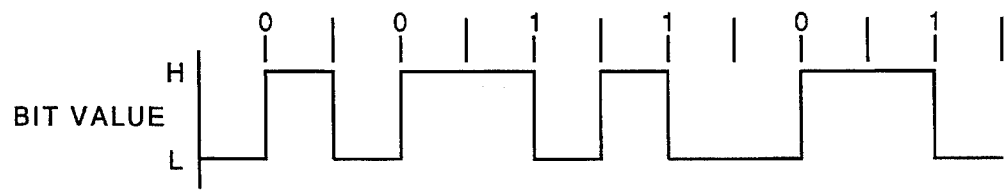
FIG_3
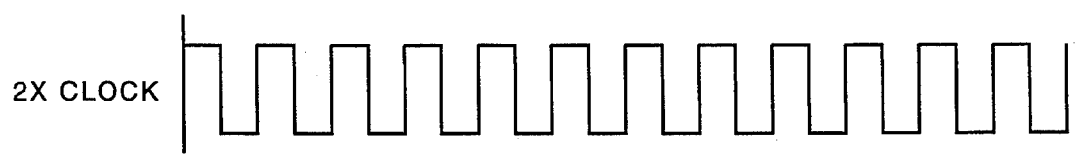
FIG_4
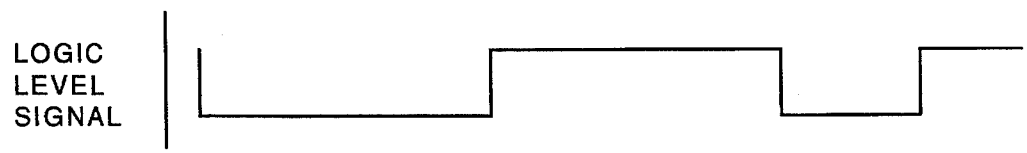

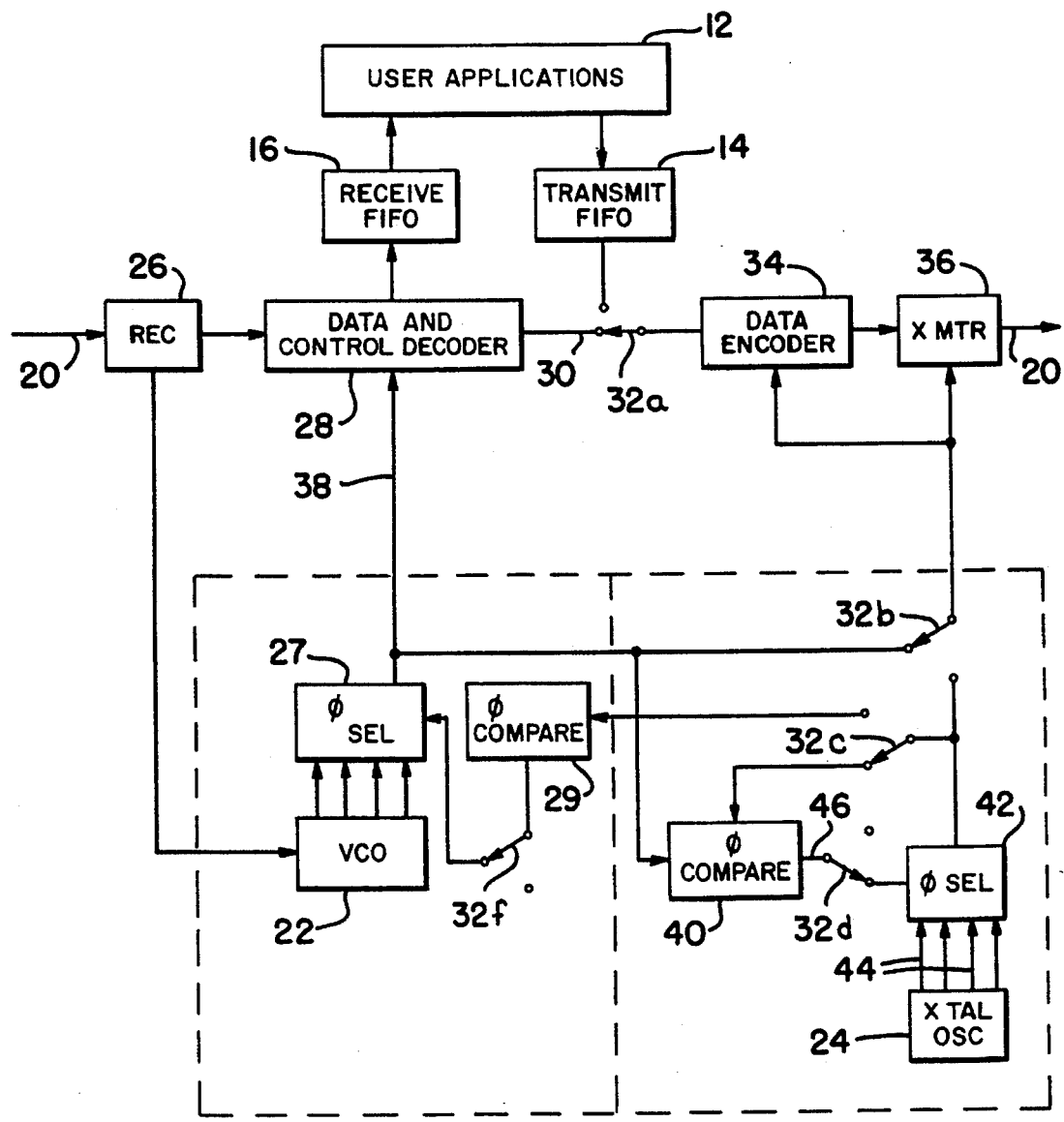
FIG_5

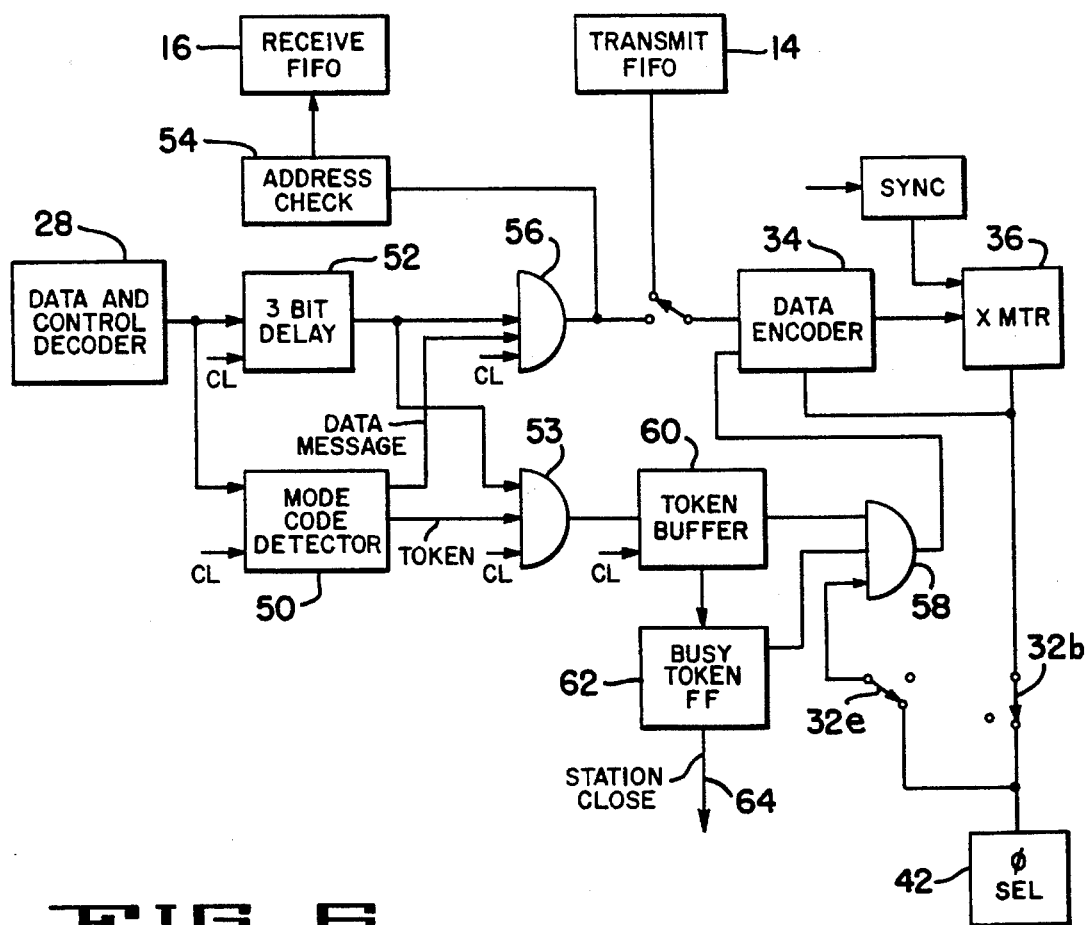
FIG_6
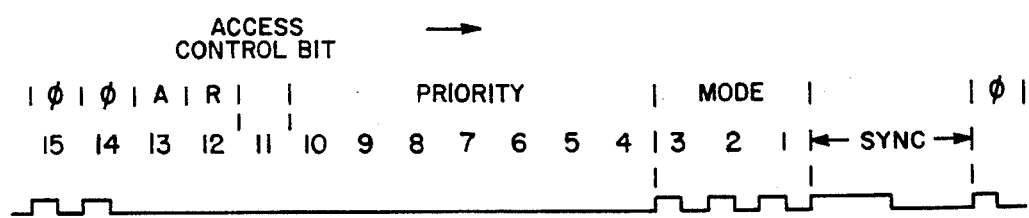
FIG_7

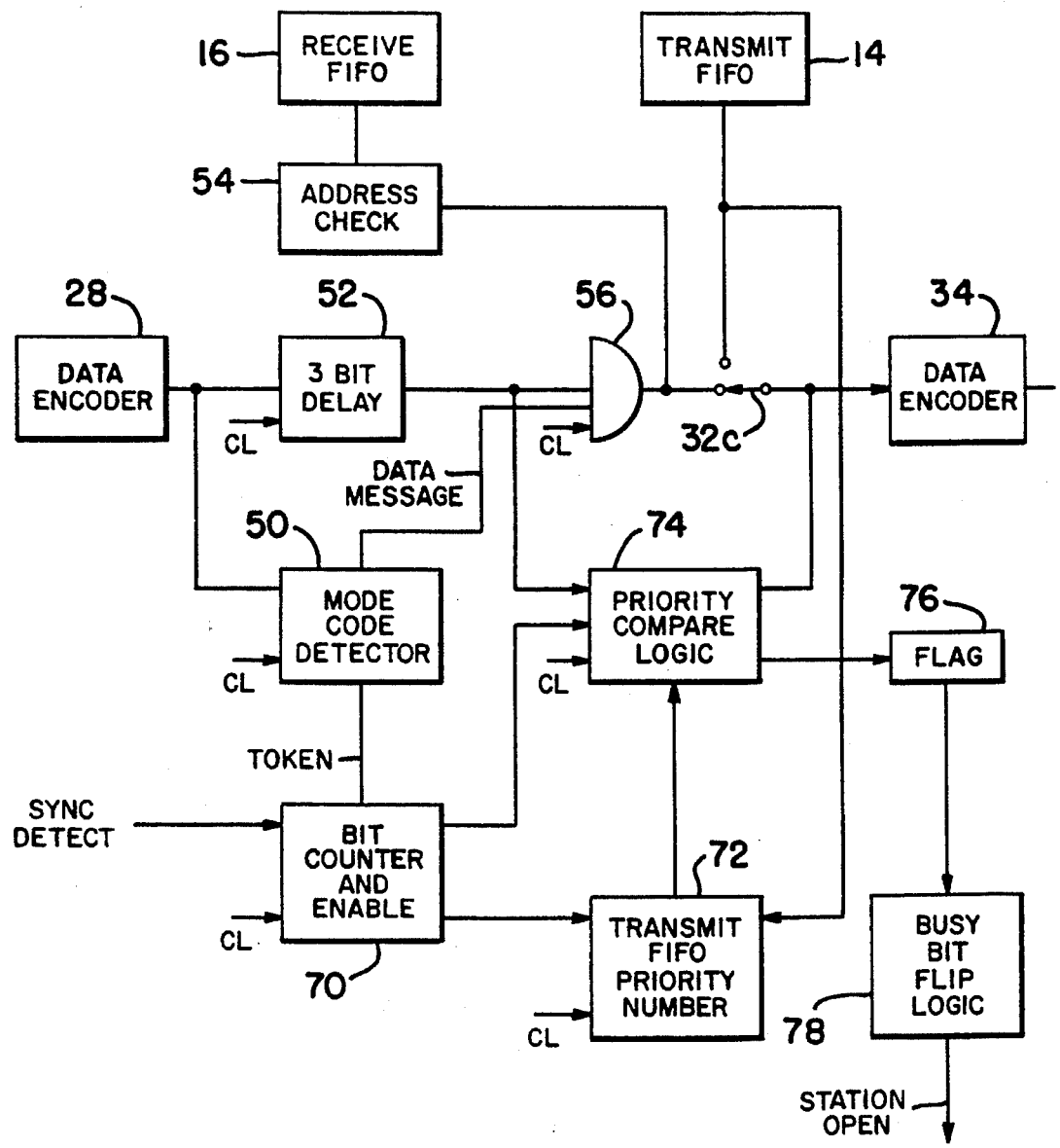

ACCESS TO TRANSMIT ON A MESSAGE PRIORITY BASIS

This application is a continuation of application Ser. No. 07/652,805, filed Feb. 6, 1991, now abandoned.

This invention relates to high speed ring bus data transmission systems for transmitting data between a plurality of interconnected and serially arranged stations, and more particularly to a system for management of the ring bus so that access to transmit is given to stations based on the priority of the data message frame awaiting transmission at that station.

BACKGROUND

Networking among a large number of data stations has found widespread use. A ring bus maybe connected to a number of stations each of which has the capacity to receive from and transmit to the others. A number of prior efforts are described in Champlin et al. U.S. Pat. Nos. 4,665,518 granted May 12, 1987, 4,627,070 granted Dec. 2, 1986 and 4,486,852 granted Dec. 4, 1984; Miller et al. U.S. Pat. No. 4,038,494 granted Jul. 26, 1977 and Niemi et al. U.S. Pat. No. 3,980,820 granted Sep. 14, 1976. Familiarity with the disclosures in these patents will assist in understanding the present invention which constitutes an improvement that allows operation of the data bus at higher speeds without loss of integrity of the transmitted signal.

Prior practice for granting access did not allow immediate access for high priority messages. Existing systems allow one or more additional low priority messages to gain access before a waiting higher priority message can be transmitted.

SUMMARY OF INVENTION

An object of this invention is to provide an improved priority handling procedure. This system examines all current message priorities and grants immediate access to any "highest" priority message and ensures that all waiting messages of lower priority are serviced in priority order. Management of the ring bus for allowing access to transmit is under control of a token having an access control bit position that indicates whether the ring bus is "available" or "busy". Access to transmit cannot be acquired merely by receiving an "available" token since a data message frame having a higher priority may be ready for transmission at another station on the ring bus.

A feature of the invention resides in pre-assigning a priority number to each data message frame that may be presented at a station for transmission on the ring bus. When a data message frame is ready for transmission and an "available" token is received, the first step toward gaining access to transmit is to examine and modify, if higher, the priority number in the token to serve as part of the access control message. The second step is to determine whether any other station has a data message frame with a higher priority.

For priority numbers less than a maximum "highest" priority number, the access control message is circulated to each other station on the ring bus. The priority number in the access control message can be only adjusted upwardly by a station having a data message frame which has a higher priority number. With no other higher priority messages waiting the token continues around the ring bus until it arrives back at the station which modified the priority that remains in the access control message. Upon detecting a match between the priority number in the access control message and the priority number of the data message frame in the transmit queue, access to transmit is granted by converting the access control bit in the token to a "busy" condition.

For data message frames having the "highest" priority number, access to transmit is instantly granted without circulation of the token around the ring bus because no other station can have a data message frame having a higher priority.

These and other objectives of the invention will become more fully apparent from the claims and from the description when read in conjunction with the drawings.

BRIEF DESCRIPTION OF DRAWINGS

FIG. 1 is a diagrammatic view of a dual channel ring bus which connects a group of stations together in a communication network in which the present invention is adapted for use.

FIG. 2 is a waveform of a phase encoded binary signal known as Manchester encoding.

FIG. 3 is a received clock signal at twice the bit frequency of the incoming signal of FIG. 2.

FIG. 4 is a pulse wave form of the logic level format carrying the same data information as in FIG. 2.

FIG. 5 is a block diagram illustrating use of dual oscillators in accord with the present invention.

FIG. 6 is a block diagram of that portion of a station that is effective in converting an open station for transmitting data messages originating at the station to a closed station for relaying data messages originating at other stations on the ring bus.

FIG. 7 is a diagram of a token which is included in the data stream on the ring bus that manages access to the ring bus so that only one station at a time can access the ring bus for transmitting data message frames. Frames are transmitted according to the priority of the message and this allows the access to be based on the priority field of the waiting message and the priority field contained within the access control message.

FIG. 8 is a block diagram of that portion of a station that is effective to convert a closed station to an open station.

DETAILED DESCRIPTION OF PREFERRED EMBODIMENT

The basic configuration of the system embodying the present invention is illustrated in FIG. 1 and includes a large number, up to 50 or more, bus interface units (BIU) 10 which are connected in series around a dual counter flow data transmission ring bus so that each station can transmit to each other station on a priority access basis on the active ring. BIU 10 serves to interconnect a user application 12 at each station and each station may have a transmit or a receive capability, or both, by using separate transmit FIFO buffer memories 14 and receive FIFO buffer memories 16.

As in the asynchronous bus system described in the Champlin et al. U.S. Pat. No. 4,627,070, the disclosure of which is hereby incorporated by reference, the media segments 20 may be any suitable transmission media and form a dual ring bus. Currently preferred media are RF cables, twisted pair wires or fiber optical cables. The media are routed between BIU 10 of adjacent stations. The media 20 are physically separate and electrically or optically connected in parallel so that if one transmission media between two adjacent stations becomes defective, transmission will automatically and without operator intervention switch to alternate media. In the event of a break in both media between the same two adjacent stations, transmission can yet be maintained with a method of loopback as explained in U.S. Pat. No. 4,627,070 as a hybrid loop.

The system preferably employs a phase encoded signal such as the Manchester code as illustrated in FIG. 2. This conventional signal comprises a series of bit periods with the data signal either rising to indicate a logic 0 or falling to indicate a logic 1 at exactly the mid point of the bit. Thus, the data has equal excursions about a neutral point and the use of this code prevents loop currents from degrading the data signal with wire media. Also, the same pulse train on a single transmission signal channel can carry access control, test and sync signals as well as data messages of varying duration.

The incoming signal of FIG. 2 is applied to the data and control decoder stage 28 in FIG. 5 which produces an output signal having a logic signal as shown in FIG. 4. The voltage controlled oscillator (VCO) 22 provides an output clock signal that is two times the bit frequency of the incoming pulse train signal and the frequency and phase are controlled in a manner known to those skilled in the art to be in sync with the incoming data signal. The output signal from the VCO 22 is illustrated in FIG. 3.

FIG. 5 is a block diagram of a relevant portion of one of the BIU stations 10 of FIG. 1 which employs dual oscillators 22 and 24. The received data signal in media 20 is provided to a receiver 26 which passes the clock transitions to VCO 22 and the digital signal of FIG. 2 and to data and control decoder stage 28 where the output signal is that of FIG. 4 and adapted for use in logic circuitry of a conventional type.

When the station is relaying a message that originated at another station, an output from decoder 28 on lead 30 of FIG. 5 is passed through switch 32a to data encoder 34. In data encoder 34, the data signal of FIG. 4 is converted back to a Manchester code as illustrated in FIG. 2 and clocked out of transmitter 36 which relays the data from encoder 34 along the next leg of the transmission media 20 as also illustrated in FIG. 1.

In an active ring bus environment, each closed station must repeat the data information traveling around the ring bus. The repeat or relay transmitter must maintain a synchronization with the incoming signal that is repeated. The present invention uses VCO 22 of FIG. 5 to generate a signal having a frequency that is twice the incoming bit frequency signal and applies that clocking signal on line 38 to the decoder 28. The same clocking signal is applied through switch 32b to both the encoder 34 and the transmitter 36. By this arrangement, the frequency and phase of the relayed signal is maintained in sync with the incoming or received data signal at a renewed power level.

If the incoming data signal is preceded by an address identifying this station as the recipient of the message, the incoming signal is stored in the received FIFO buffer memory 16 and made available to the user applications 12 of FIG. 1 in the usual manner.

When the user applications 12 has a message in transmit buffer FIFO 14 ready for transmission on the ring bus, the transmitter 36 must await receipt of a signal granting access to transmit on the ring bus. Access may be granted by the passing of a token at the end of a previous data transmission as is common in certain prior art systems or by other suitable techniques. At all other times access to transmit is withheld. When access is granted, switch contacts 32a move to the alternate position to that shown in FIG. 5 so that the transmit FIFO is connected to the input of data encoder 34. Switch contacts 32b move to their alternate position so that the clocking signal will originate from local oscillator 24 through phase selector 42 with the phase selected and locked when the station opened. When the signal which originates in transmit FIFO 14 has circulated around the ring bus, that signal returns to data encoder 28 and will not be retransmitted, switch contacts 32a are in their alternate position. The signal may be addressed to receive buffer FIFO 16 and compared with the transmitted signal to determine if there has been signal error.

When switch contacts 32b move to their alternate position to change the source of the transmitter clocking signal from VCO 22 to the local crystal oscillator 24, the stations on the ring bus must lock in on the phase of the new clocking signal from oscillator 24. Assuming the frequencies of both oscillators 22 and 24 are essentially the same, it is important for a high speed (i.e. 10 to 20 MHz) ring bus to reduce the extent of bit slippage due to minor differences between individual crystal frequencies of different stations and the phase of the signal on the ring bus. In accordance with one feature of this invention the crystal oscillator 24 furnishes output signals on leads 44 that are phase shifted by 90 degrees so that when the clocking signal source is switched, the maximum bit shift can be limited to a quarter of a bit as a maximum and this locks the two clock signals to one eighth of a bit in phase slip.

To accomplish this switch of clock sources as the station closes with minimum phase slip, the phase of the clocking signal from VCO 22 may be constantly compared with the phase of the clocking signal from the local crystal oscillator 24 through switch contacts 32c by a phase comparison circuit 40. The output control signal from phase comparison circuit 40 on lead 46 and switch contacts 32d to phase select circuit 42 is effective to choose an output signal on that one of the leads 44 whose phase is closest to that of the clocking signal from VCO 22. At the moment when switch 32 is transferred and the clocking signal source is changed to local oscillator 24, the bit slippage at transmitter 36 due to phase shift of the transmitted signal is minimized.

When access to transmit is first given to a station, local oscillator 24 of that station begins to serve as a temporary master oscillator for the ring bus and the local oscillator 24 at the station previously opened for transmitting data signals originating at that station is no longer used. At the station which has just relinquished access to transmit, the clocking signals that came from its local crystal oscillator 24 and any phase shift of clocking signals of the chosen phase of VCO 22 at the moment of transition is not more than ¼ bit shifted in phase which limits the phase shift to ⅛ of a bit.

To accomplish this switch of clock sources as the station closes with minimum phase slip, the selected phase of the crystal oscillator 24 through 32b is constantly compared in a phase compare circuit 29 to the phase output of the phase selector 27 when the station is open and originating data. When the station switches to the close position, the output of phase compare through switch contacts 32f causes a lock on the phase of phase selector 27 that produces a minimum phase slippage as the station closes.

Referring now to FIG. 6, the portion of the logic at each BIU station 10 in FIG. 1 that is effective to convert a previously open station to a closed station and to cause the transmitter 36 to convert from operating with clocking signals from local oscillator 24 to operating with clocking signals from VCO 22, is illustrated. After transmitting a data message frame from transmit FIFO 14, the station causes the token of FIG. 7 to be transmitted with an access control bit indicating that the ring bus is "available" for access by another station that may have a data message frame awaiting transmission. That token circulates around the ring bus of FIG. 1 and is received at data encoder 28 of FIGS. 5 and 6.

The token in Manchester format shown in FIG. 7 comprises first a sync signal that is followed by a three bit mode code field. A mode code for the illustrated token is three Manchester 0's. The mode code for a data message frame may have two Manchester 1's and one 0.

After the Manchester code signal is converted as described in connection with FIGS. 2–4, the signal is applied to a mode code detector 50 in FIG. 6 which produces two gating signals, one indicating a token and the other indicating a data message frame. If a token is received, the output data decoder 28, after a three bit delay in register 52, is clocked into a token buffer 60 through logic including AND gate 53. If a data message frame is received, the message is supplied to address detector 54 through AND gate 56 and is not retransmitted.

The token of FIG. 7 contains an access control bit in the eleventh position which, if a 0, indicates access to transmit is "available". If the bit in the eleventh position is a 1, the token indicates the ring bus is "busy" and that a data message frame follows. An output signal from the token buffer 60 controls "busy" token flip-flop 62 to produce output control signals. The "available" token signal is applied to logic including AND gate 58 which allows data fields in the token of FIG. 7 to be sent to the data encoder 34 under control of the clocking signal from the local crystal controlled oscillator through switch contacts 32e from phase select 42 as described in connection with FIG. 6. The token is then reissued as an "available" token.

Transmission of the reissued token remains the responsibility of the open station which was last to transmit a data message format. The transmitter 36 transmits Manchester 0's during intervals between transmissions of tokens and between transmission of token and a data message frames.

If the eleventh bit of a token is a 1, the token has a "busy" indication. This means another station on the ring has gained access to transmit. The crystal controlled oscillator 24 at the other station is concurrently transmitting a data message frame that is in the pulse train following this token.

The detection of a "busy" bit in the token of buffer 60 causes the "busy" token flip-flop 62 to trigger to its alternate position which, in effect, closes AND gate 58. This removes the token buffer from the system. The "busy" token flip-flop 56 also produces a station close signal on lead 64 that is effective to transfer all of the contacts associated with switch 32 to the position illustrated in FIG. 5. Thus the encoder 34 and the transmitter 36 are thereafter under control of the clock signals from VCO 22 and the station is in the closed or active relay mode of operation for data.

FIG. 8 shows that portion of the circuit in each BIU station 10 in FIG. 1 that is effective to convert a previously closed station which had served as an active relay station, to an open station that will transmit a message waiting in its transmit FIFO buffer 14. The design objective is to introduce a delay and phase shift that is minimized at the moment when access is granted.

The incoming Manchester signal is supplied to data decoder 28 and after conversion to a logic signal is routed to the mode code detector 50 to determine whether a token or a data message frame is about to be received. After examining the three bits in the mode code field, a token identifying signal is supplied to bit counter and enable circuitry 70 which counts the receiver clock signals to generate enable pulses that allow correct interpretation of bits and fields. For example, the priority field in the access control message must be looked at bit-by-bit on-the-fly from bit 4 through bit 10. Any modification to the priority bits or the access control bit in bit field 11 must also be made on-the-fly.

If this station does not have a data message frame awaiting transmission, the priority compare logic 74 will not change an existing priority number in the priority field bit positions 4–10 of the token or change the access control bit in bit field 11.

Since the token is issued with a priority number of zero and the mode code for a token is selected to be three 0's, the entire token may consist of a sync signal followed by 0's in the next 15 bit positions as illustrated in FIG. 7. No end of transmission signal is provided in this embodiment because reading of the token message terminates at the end of a fixed number of bits following the sync signal. The transmitter is designed to transmit Manchester 0's unless another sync signal is supplied. Therefore, implementation of this system may be relatively simple.

An important feature of this system is that messages are caused to be transmitted on the basis of the priority of each data message. All data message frames that are transmitted on the ring bus are pre-assigned with a priority number when the data message frame is queued in transmit FIFO 14 in FIG. 1 ready for transmission. The assigned priority number is entered into transmit FIFO priority number register 72 of FIG. 8.

The token of FIG. 7 has a priority number consisting of seven bits in positions 4–10. In a binary format, the priority numbers from 0–127 are possible. As the token bits are clocked through priority compare logic 74, the priority number from register 72 is compared and modified on-the-fly so that when the token exits from this station, the token may have a higher priority number in its priority field.

If at this station a higher priority number is inserted, a flag 76 is set at that time. If the token returns and has exactly the same priority number, the access control bit in token field 11 is set to the "busy" condition and the "busy" bit flip logic 78 is set and a station open signal is generated, thus returning the switch 32 contacts to the positions illustrated in FIG. 6. Much of the beginning part of the token has already been re-transmitted prior to appearance of the station open signal. Transmission of the "busy" condition prevents any station from gaining access to transmit as a consequence of receiving a "busy" token and closes the previously open station. The "busy" token is transmitted under control of the clocking signal from VCO 22. Conversion to use clocking signals from the local crystal oscillator 24 of FIG. 5 is delayed until all data bits in the token have been transmitted.

If the priority number has been successfully inserted in the token and the flag 74 set and the token returns with a higher priority number as determined in priority compare logic 74, flag 76 is reset as access to transmit has to be denied. The station must thereafter initiate again the procedures necessary to acquire access to transmit. The reason a higher priority number was in the token is that another station on the ring bus has a data message frame with a higher priority that is also awaiting transmission. Thus, access to transmit is withheld until after a determination has been made that no other station has a data message awaiting transmission which has a higher priority level or number.

If the token, when received, has a lower priority number than is in register 72, the higher priority number in register 72 is substituted for the lower priority number and the flag 76 is set.

If the token when received already has exactly the same priority number as is in register 72, nothing happens because flag 76 had not been set. The token continues around the ring bus until the station which inserted that priority number and set its flag 76, again receives the token in an unaltered form. At this time, the token is converted to a "busy" token.

If the priority number in register 72 is the highest possible (i.e. 127 in the illustrated example), the token is instantly converted to a "busy" token and relayed on the ring bus without waiting for the token to circulate around the ring before transmission of the data message frame. Obviously, no station can have a higher priority message.

If the next station also has a "highest" priority message, it can capture the "available" token that is always appended to each data message frame. This would allow two or more data message frames to be transmitted with a delay of only one token rotation. If a series of "highest" priority data message frames are simultaneously ready for transmission, access is granted on the basis of the first to receive the "available" token.

Control of the order in which messages are transmitted can be effected by the choice of the relative numeric values assigned for the first data message frame in each transmit FIFO buffer priority register number 72.

When the access bit of the access control message in the token of FIG. 7 is flipped to indicate a "busy" status, the "busy" bit logic 78 generates an station open signal which in effect causes switch 32 of FIG. 6 to change the position of all contacts 32a–32e. Control of the ring bus is thus transferred from the station last to transmit to the station which has now been granted access to transmit and indeed has started transmitting its data message frame. The ring bus is maintained by the local oscillator 24 in FIG. 5 of that station until a new station obtains access to transmit.

While only a single embodiment has been described, it is apparent that many changes and variations will become evident to those skilled in the art. All changes which fall with the scope of the claims and equivalents thereof are intended to be embraced thereby.

We claim:

1. A method for granting to a station access to transmit on a ring bus based on priorities accorded to data message frames awaiting transmission comprising:

assigning a priority number to each data message frame adapted for transmission on the ring bus;

circulating on the ring bus a token having a priority field adapted to receive said priority number;

at a station having a data message frame awaiting transmission entering the priority number of said data message frame into the priority field of the token;

granting access to transmit only after processing the token to assure that no other station has another data message frame having a higher priority;

transmitting a "busy" condition that prevents any other station from gaining access to transmit; and wherein the token having an entered priority number less than the "highest" possible is processed by:

circulating the token to each other station on the ring bus after entry of the priority number;

at each other station having another data message frame awaiting transmission, modifying the priority number in the priority field of the token only if the priority number at said other station is higher than the priority number previously entered; and granting access to transmit to whichever station receives the token having the priority number that was previously entered into the priority field by it.

2. A method of controlling access to transmit on a ring bus by one of a plurality of stations interconnected by the ring bus comprising:

issuing an access control message to follow a data message frame that is transmitted by a first station on said ring bus;

circulating said access control message around the ring bus from the station which was last to transmit through all other stations associated with the ring bus and back to said first station:

re-issuing the access control message at said first station upon making a determination that the access control message does not have a "busy" status;

converting on-the-fly the circulating access control message to have a "busy" statics at a second station having a new data message frame ready for transmission on said ring bus;

terminating the issuance or re-issuance of the access control message to have a busy status at a second station having a data message frame ready for transmission on said ring bus; and thereafter transmitting from the second station said new data message frame followed by a newly issued access control message.

3. The method of claim 2 further comprising at receiving stations connected to the ring bus the steps of:

directing data message frames through a first signal channel including an address check;

directing access control messages through a second signal channel during which time a priority number in the access control message is examined;

relaying on the ring bus the data message frame without change; and relaying on the ring bus each access control message having a "busy" access control message without change.

4. The method of claim 3 wherein at a station having a data message frame awaiting transmission, the step of converting in the second signal channel an access control message that does not have a "busy" status to have a "busy" status before the access control message is relayed.

5. The method of claim 3 wherein access to transmit is controlled on a basis of message priority which further comprises the steps of;

assigning a priority number to each data message frame awaiting transmission at each station;

attempting to modify an access control message not having a "busy" status by upgrading it with the priority number of a data message frame awaiting transmission while the access control message passes through said second signal channel; and converting the circulating access control message to have a "busy" status only at the station which entered the modifying priority number after determining no other station has awaiting for transmission a data message frame having a higher priority number.

6. The method of claim 5 wherein the priority number is the "highest" possible number and the access control message is converted instantly to have a "busy" status.

7. The method of claim 5 wherein the priority number is less than the "highest" possible number and the conversion of the access control message to have a "busy" status follows the step of circulating the modified access control message having the priority number around the ring bus and thereafter matching the modified priority number of the circulated access control message with the priority number of the data message frame at the station which entered the priority number.

8. A method of controlling access to transmit on a ring bus by one of a plurality of stations interconnected by the ring bus comprising:

issuing an access control message to follow a data message frame that is transmitted by a first station on said ring bus;

assigning a priority number to each data message frame awaiting transmission at each station;

circulating said access control message around the ring bus from the station which was last to transmit through all other stations associated with the ring bus and back to said first station:

converting on-the-fly the circulating access control message to have a "busy" status at a second station having a new data message frame ready for transmission on said ring bus by;

modifying another access control message not having a "busy" status by upgrading bit-by-bit the priority number of another data message frame awaiting transmission while the access control message passes through the station having the other data message frame awaiting transmission;

circulating the modified other access control message around the ring bus;

modifying the priority number in the circulation access control message at any other station having a data message frame also awaiting transmission that has been assigned a higher priority number, with said higher priority number; and converting the circulation access control message to have a "busy" status only at the station which previously entered the modified priority number; and thereafter transmitting from the second station said new data message frame followed by a newly issued access control message.

9. The method of claim 8 wherein the higher priority number is the "highest" possible number and the access control message is converted instantly to have a "busy" status.

10. The method of claim 8 wherein the higher priority number is less than the "highest" possible number and the conversion of the access control message to have a "busy" status follows the step of circulating the modified access control message having the higher priority number around the ring bus and thereafter matching the modified priority number of the circulated access control message with the priority number of the data message frame at the station which upgraded to the higher priority number.

11. A ring bus communication system comprising:

a plurality of stations capable of transmitting to and receiving binary data transmissions from said other stations on the each of said other stations having means for receiving transmitted data signals on the ring bus and a transmitter (1) for retransmitting said received signals and (2) for transmitting data messages as original transmissions:

means for granting access to transmit original data messages on the ring bus to only one station at a time;

means including a token which circulates to all stations on the ring bus for indicating when the ring is available for a new data message transmission;

means to upgrade a priority signal in a circulating token at each station having a data message awaiting transmission;

means at the upgrading station for granting access to transmit on the ring bus in response to a confirmation that no other station has a data message waiting transmission which has a higher wherein the priority signal upgrading means includes:

a register for holding a priority number that has been assigned to a data message that is ready for transmission;

a compare circuit having one input for receiving the token from the ring bus and a second input for receiving the priority number of said register, said compare circuit being capable of modifying the priority number in the token as the token passes through the compare circuit; and means for retransmitting the token on said ring bus;

means for indicating a priority level that has been assigned to each data message awaiting transmission on the ring bus; and circuit means that prevents other stations from gaining access when a busy, token is transmitted and until after a determination is made that no other station has a data message awaiting transmission which has a higher priority level.

12. The system of claim 11 wherein the compare circuit receives incoming token data on a bit-by-bit basis which is compared bit-by-bit with the register priority number and the token data is modified on a bit-by-bit basis only if the register priority number is greater than the priority number in the incoming token data.

13. The system of claim 12 further including a bistable flag circuit with means for setting the circuit when the token data is modified at the compare circuit; and means including a signal from the flag circuit when a match occurs between the priority numbers in the token data and the priority register for activating said access granting circuit means.

14. A ring bus communication system comprising:

a plurality of stations capable of transmitting to and receiving binary data transmissions from said other stations on the ring bus;

each of said other stations having means for receiving transmitted data signals on the ring bus and a transmitter (1) for retransmitting said received signals and (2) for transmitting data messages as original transmissions;

means for granting access to transmit original data messages on the ring bus to only one station at a time;

means including a token which circulates to all stations on the ring bus for indicating when the ring is available for a new data message transmission;

means for indicating a priority level that has been assigned to each data message awaiting transmission on the ring bus; and circuit means that prevents other stations from gaining access when a busy token is transmitted and until after a determination is made that no other station has a data message awaiting transmission which has a higher priority level, wherein the token has a field for storing data message priority information and an access control status indicating bit and each station further comprises:

means for modifying the token field to indicate the priority of a data message awaiting transmission only if the priority is higher than any priority contained in the token as received;

means for re-transmitting the token with the modified priority; and means for converting the access control bit to a "busy" condition when the token is returned to the modifying station with the priority entered by that station to thereby grant access to transmit.

* * * * *